(12) United States Patent
Portal

(10) Patent No.: US 7,516,927 B2
(45) Date of Patent: Apr. 14, 2009

(54) DEVICE FOR LOCKING AN ELECTRIC APPARATUS ONTO A SUPPORTING RAIL

(75) Inventor: Alex Portal, Biot (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 313 days.

(21) Appl. No.: 11/290,477

(22) Filed: Dec. 1, 2005

(65) Prior Publication Data
US 2006/0175489 A1 Aug. 10, 2006

(30) Foreign Application Priority Data
Dec. 16, 2004 (FR) .................................. 04 53031

(51) Int. Cl.
*A47B 96/00* (2006.01)
(52) U.S. Cl. ...................... 248/221.11; 248/222.12; 439/532
(58) Field of Classification Search ............ 248/225.11, 248/221.11, 222.12, 222.52, 223.31, 231.61; 439/532, 716, 717
See application file for complete search history.

(56) References Cited

U.S. PATENT DOCUMENTS

| | | | | |
|---|---|---|---|---|
| 4,269,471 A | * | 5/1981 | Woertz ........................ 439/94 |
| 5,192,227 A | * | 3/1993 | Bales ......................... 439/532 |
| 5,704,805 A | * | 1/1998 | Douty et al. ................ 439/532 |
| 5,775,955 A | | 7/1998 | Graube et al. |
| 5,842,889 A | | 12/1998 | Koellmann |
| 5,890,916 A | * | 4/1999 | Diekmann et al. ............ 439/94 |
| 6,146,213 A | * | 11/2000 | Yoon .......................... 439/716 |
| 6,293,820 B1 | | 9/2001 | Bechaz et al. |
| 6,563,697 B1 | * | 5/2003 | Simbeck et al. ............. 361/668 |
| 6,840,819 B2 | * | 1/2005 | Bet et al. .................... 439/716 |

FOREIGN PATENT DOCUMENTS

DE 197 09 811 A1 9/1998
WO WO 00/62385 10/2000

* cited by examiner

*Primary Examiner*—J. Allen Shriver, II
*Assistant Examiner*—Bradley H Duckworth
(74) *Attorney, Agent, or Firm*—Oblon, Spivak, McClelland, Maier & Neustadt, P.C.

(57) ABSTRACT

A device for locking an electric apparatus to a supporting rail with two opposite raised edges, the device including a first attachment unit configured to be connected with a first raised edge of the supporting rail; a second attachment unit configured to be connected with a second opposite raised edge of the supporting rail, configured to be movable in an unlocked position; and an operating element connected to the first and second attachment units and configured to convert a translation movement of the first attachment unit into a rotary movement of the second attachment unit, the second attachment unit including a rod that is configured to perform the rotary movement when actuated by the translation movement of the operating element.

14 Claims, 4 Drawing Sheets

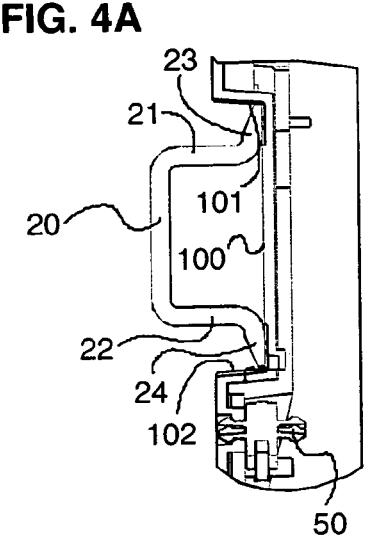
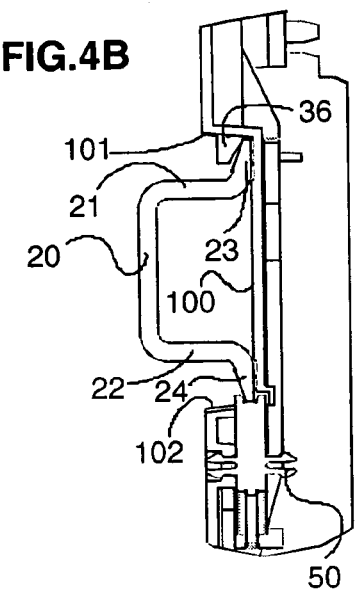
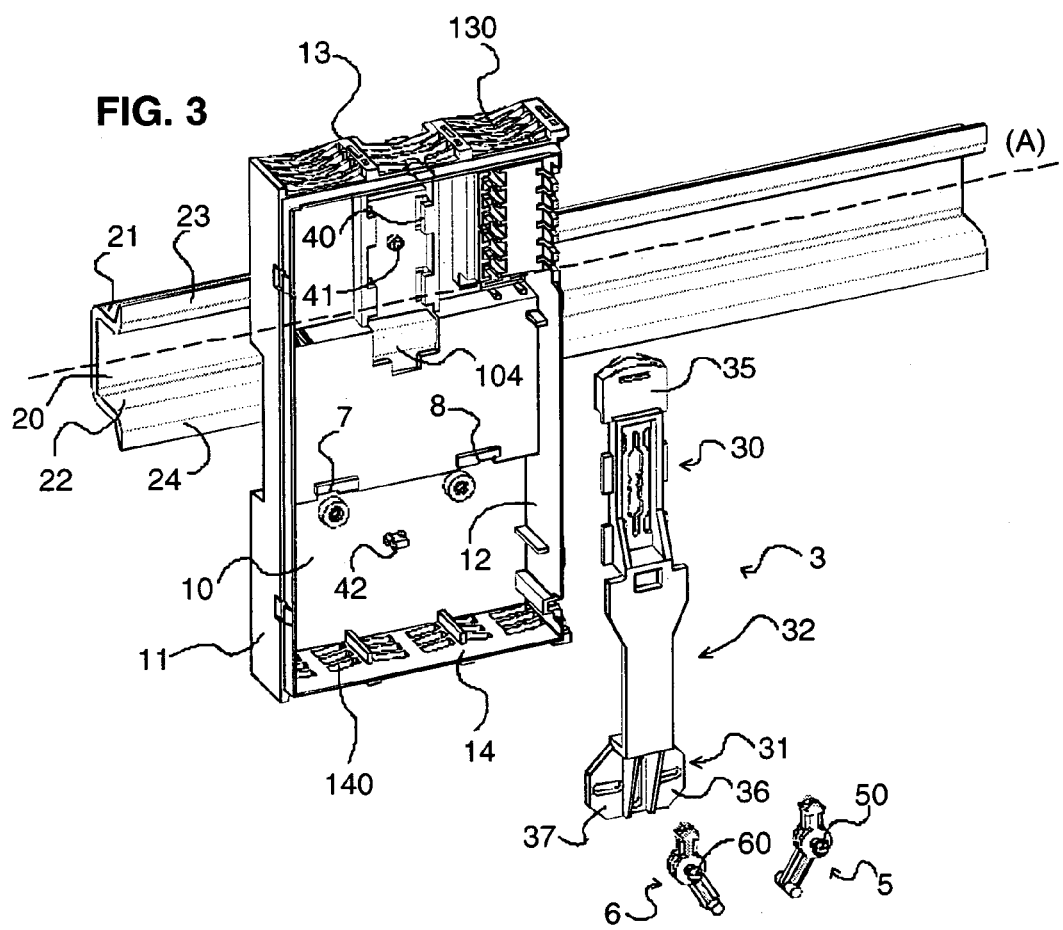

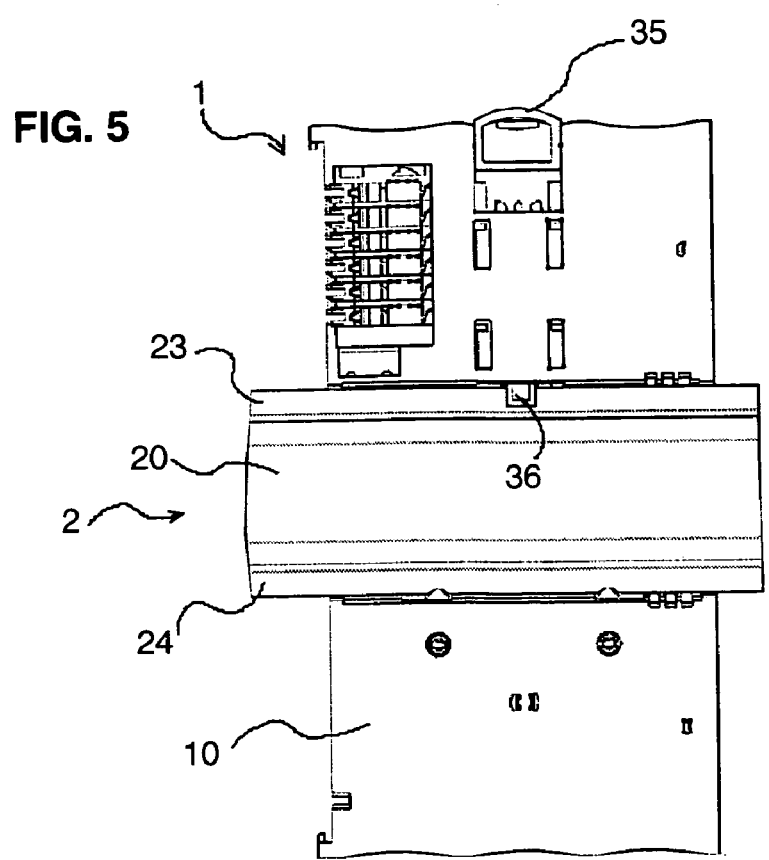
FIG. 5
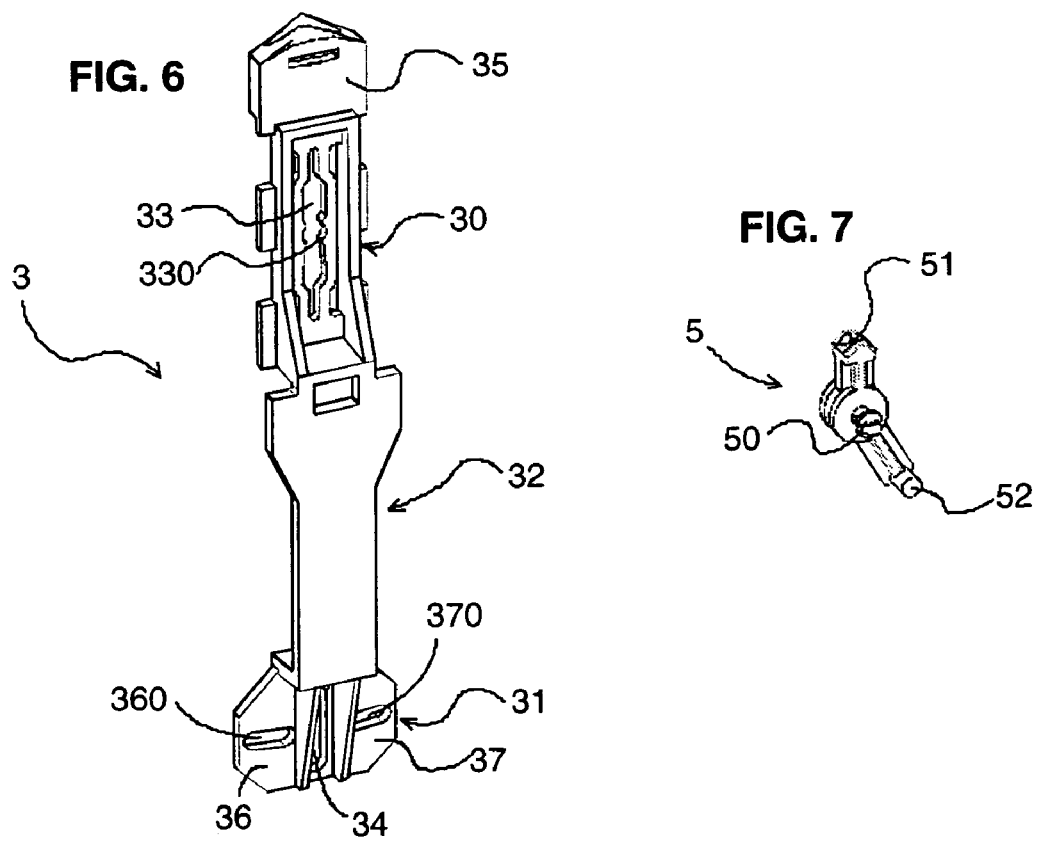
FIG. 6
FIG. 7

DEVICE FOR LOCKING AN ELECTRIC APPARATUS ONTO A SUPPORTING RAIL

BACKGROUND OF THE INVENTION (1) Field of the Invention

The present invention relates to a device for attaching an electric apparatus onto a supporting rail with two opposite raised edges. The invention is particularly suitable for the attachment of an electric apparatus onto a DIN rail.

(2) Description of the Related Art

U.S. Pat. No. 5,775,955 reveals a device for attaching an electronic module onto a DIN rail having two opposite coplanar raised edges. The attachment device comprises two distinct and independent plates intended to be slid into two lateral openings formed on the body of the module. Each plate makes it possible to come and lock the module onto a raised edge of the rail. In this patent, the attachment of the module is not very practical because it requires two successive manipulations.

Also known via U.S. Pat. No. 5,704,805 is a device for attaching an electric apparatus onto a DIN rail having two opposite raised edges comprising a single control point. For that, the device comprises two hooks each intended to receive a raised edge of the rail and an actuator capable of controlling the simultaneous movement of the two hooks. The actuator consists of a screw acting on the two hooks by means of a plate. Screwing/unscrewing the screw causes the plate to move which in turn causes the hooks to move.

In such a device, even if the control means is one and the same for locking the apparatus onto the two raised edges of the rail, it requires a specific control means which markedly increases the number of parts necessary to manufacture it. In addition, with such a configuration, a user must carry out an action on the screw with the aid of a screwdriver while he holds the electric apparatus on the rail, which proves awkward in use. Finally, such an attachment device is accessible only inside the electric apparatus and therefore is impossible to manipulate when, for example, the apparatus is closed and ready for use.

Documents U.S. Pat. No. 6,293,820, DE 197 09 811, U.S. Pat. No. 5,842,889 and WO 00/62385 all propose coupling devices comprising an actuation means that can be accessed from the outside by the operator and making it possible to actuate two coupling means simultaneously on each of the raised edges of the rail. Document U.S. Pat. No. 5,842,889 in particular describes an attachment device comprising a rod movable in translation furnished with one end for holding and one end interacting with an actuation mechanism consisting mainly of two flexible branches connected to the apparatus and furnished with coupling means. The translation of the rod in the direction of the rail causes the branches to stretch and the apparatus to clamp onto the rail.

In the latter documents, the actuation member is also specific and makes it possible to actuate simultaneously the two coupling means on each of the raised edges of the supporting rail.

BRIEF SUMMARY OF THE INVENTION

The object of the invention is to propose a device for locking an electric apparatus onto a supporting rail that is simple in its design and in its use while allowing a very good coupling of the electric apparatus.

This object is achieved by a device for locking an electric apparatus onto a supporting rail with two opposite raised edges, said device having at least two attachment means, a first attachment means intended to come into contact with one raised edge of the supporting rail and a second attachment means intended to come into contact with the opposite raised edge of the supporting rail, these attachment means being movable and able to take a locked position on their respective raised edge of the supporting rail or an unlocked position, said device being characterized in that it comprises operating means connecting the first attachment means to the second attachment means and capable of converting a translation movement of the first attachment means into a rotary movement of the second attachment means.

The locking device according to the invention makes it possible to come and lock an electric apparatus onto the rail using a single operation while causing the movement of the second attachment means via the movement of the first attachment means.

According to the invention, it is therefore by commanding in translation the first attachment means that the second attachment means is simultaneously actuated in rotation.

According to a first particular feature, the operating means comprise an actuation member capable of causing a translation movement integral with the movement of the first attachment means. According to the invention, the translation movement of the actuation member performed by the operator to couple the electric apparatus onto the supporting rail is therefore that which makes it possible to actuate the first attachment means. Unlike the prior patents, a single part is therefore used for the actuation of the device and to carry out the coupling onto one of the raised edges of the rail.

According to another particular feature, the translation movement of the actuation member is performed perpendicularly to the axis of the supporting rail and parallel to a bearing plane formed by the raised edges of the supporting rail. In documents DE 197 09 811 and U.S. Pat. No. 5,842,889, the movement of the actuation member is performed perpendicularly to the axis of the rail and perpendicularly to the bearing plane formed by the raised edges of the supporting rail.

According to another particular feature, the second attachment means comprises two distinct attachment points on the raised edge of the supporting rail. Thus, the electric apparatus is locked onto the rail at three distinct points which makes it possible to obtain a perfect stability of the apparatus on the rail. According to the invention, the locking of the apparatus onto the supporting rail at three points is achieved by a single control movement.

According to a first embodiment of the invention, the second attachment means comprises, for each of its attachment points, a rod fixedly attached to the electric apparatus and mounted in rotation thereon, said rod comprising one end mounted in a guide rail formed in the actuation member and one free end capable of coming to lock said electric apparatus onto a raised edge of the supporting rail.

According to a second embodiment of the invention, the second attachment means comprises, for each of its attachment points, a rod fixedly attached to the electric apparatus and mounted in rotation thereon, said rod and the actuation member being connected by means of an elastically deformable part.

According to a particular feature of this second embodiment, the rod, the elastically deformable part and the actuation member form a single part.

According to the invention, the translation movement of the actuation member rotates the two rods in opposite directions.

Advantageously, the attachment device according to the invention comprises two identical rods mounted in parallel, symmetrically relative to the axis of translation of the actuation member. With such an arrangement, the electric apparatus is locked onto the rail at three distinct points, one point on the top raised edge of the supporting rail and two points on the bottom raised edge of the supporting rail.

Advantageously, at its free end, the rod has a rib in which the raised edge of the supporting rail is capable of coming to lodge when the second attachment means is in its locked position. This makes it possible to improve the locking of the electric apparatus onto the supporting rail.

According to another particular feature, the actuation member is controlled manually. The actuation member is for example accessible from the outside of the electric apparatus. It may for example be a tab that it is possible to pull or to push to actuate the actuation member and therefore the rods connected to the actuation member. The single movement of the actuation member makes it possible therefore to lock the apparatus perfectly onto the rail.

Advantageously, the first attachment means comprises at least one coupling notch or hook formed on the actuation member and intended to receive the raised edge of the supporting rail. Thus the translation movement of the first attachment means formed by this hook corresponds to the translation movement of the actuation member.

Advantageously, the attachment device comprises a device capable of simultaneously holding the attachment means in their locked or unlocked position. It may for example involve elastically deformable hard points during the translation of the actuation member.

The device according to the invention is particularly suited for locking onto a supporting rail a plurality of electronic modules, such as for example various modules of a modular programmable logic controller, connected together by means of side connectors, as described in U.S. Pat. No. 5,775,955. In such a configuration, when a first module is present on the rail, a second module having to be connected to this first module is brought to rest against the raised edges of the rail and is slid until it is connected to the first module. Once the second module has been connected, its attachment device is actuated so as to be able to lock it onto the rail. The attachment device according to the invention therefore allows a user to come and connect and lock a large number of modules quickly with a minimum of manipulations.

BRIEF DESCRIPTION OF THE SEVERAL VIEWS OF THE DRAWINGS

Other features and advantages will appear in the following detailed description with reference to an embodiment given as an example and represented by the appended drawings in which:

FIG. 3 represents an exploded view in perspective of the electric apparatus and of the attachment device intended to be mounted on said apparatus.

FIGS. 4A and 4B represent, in section along A-A respectively in FIGS. 2A and 2B, the electric apparatus respectively in a position of being locked onto the supporting rail and in a position of being unlocked from this rail.

FIG. 5 represents, in a front view, the rear of the electric apparatus attached to the supporting rail.

FIG. 6 represents in detail the plate used in the attachment device according to the invention.

FIG. 7 represents a rod used in the attachment device of the invention.

Figure 1A:
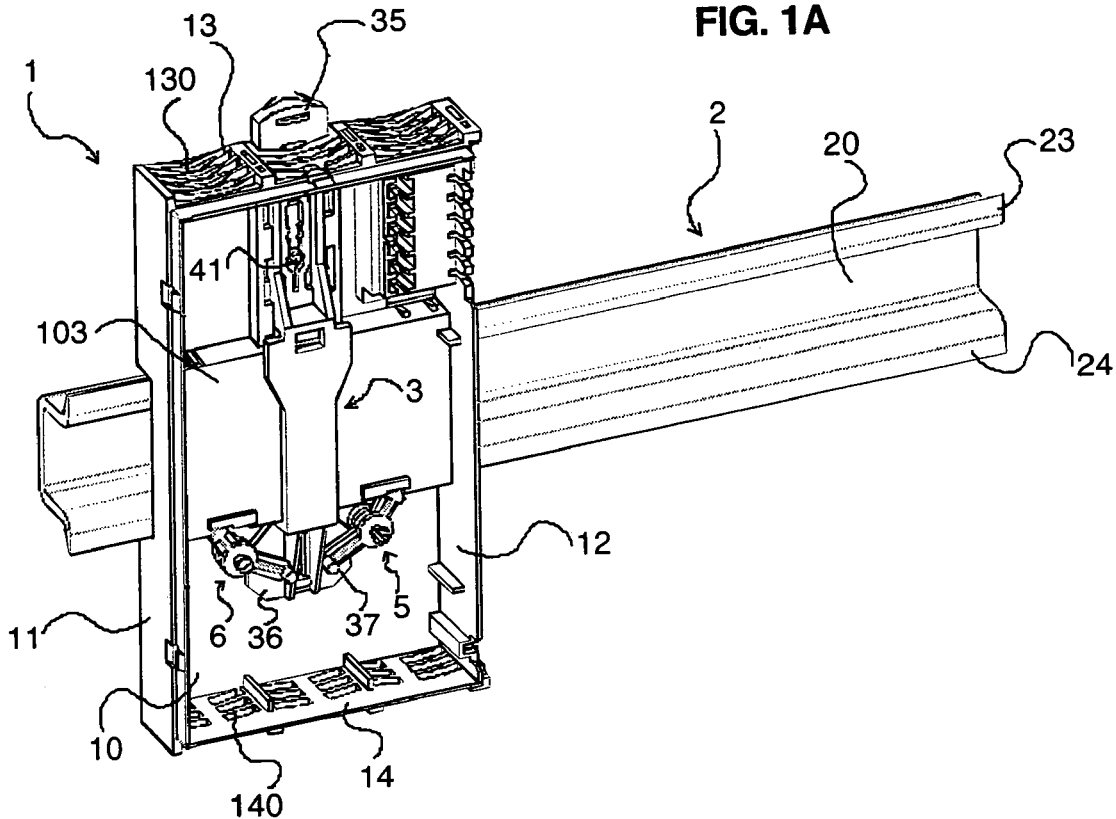
FIGS. 1A and 1B represent, in perspective, the inside of an electric apparatus furnished with an attachment device according to the invention respectively in a position of being unlocked from a supporting rail and in a position of being locked onto this supporting rail.

The invention will now be described in association with FIGS. 1A to 7.

DETAILED DESCRIPTION OF THE INVENTION

The invention consists of a device for attaching an electric apparatus 1 onto a supporting rail 2. This supporting rail 2 extends along a main axis (A), is extruded and bent so as to have a hat-shaped cross section. It has a central web 20 connected to two parallel flanges 21, 22, bent so as to form two raised edges 23, 24 situated in one and the same plane either side of the central web. The top raised edge 23 of the rail forms a top edge 25 and the bottom raised edge 24 of the rail forms a bottom edge 26. The rail may support several electric apparatus placed adjacent to and where necessary connected to one another.

The electric apparatus 1 comprises a casing having a front panel (not shown), a rear panel 10, two side panels 11, 12, a top panel 13 and a bottom panel 14. The rear panel 10 has a recess 103 forming a guide passageway at the bottom of which the two raised edges 23, 24 of the rail 2 come to bear. This guide passageway is formed over the whole width of the casing and has a spacing between its top face and its bottom face slightly greater than the width of the supporting rail 2. The guide passageway therefore defines, on the outer face of the rear panel 10 of the casing, a flat bottom 100 against which the two raised edges 23, 24 of the supporting rail 2 come to rest, a top face 101 and a bottom face 102 forming an angle slightly greater than 90° with the bottom 100 of the guide passageway (FIGS. 4A and 4B). The electric apparatus 1 is attached by its rear panel 10 and for this is brought along an axis perpendicular to the bearing plane formed by the two raised edges 23, 24 of the supporting rail 2 so that the axis (A) of the supporting rail 2 is parallel with the width of the casing and so that the raised edges 23, 24 of the supporting rail 2 come to rest against the bottom 100 of the guide passageway formed on the rear panel 10 of the casing.

Figure 1B:
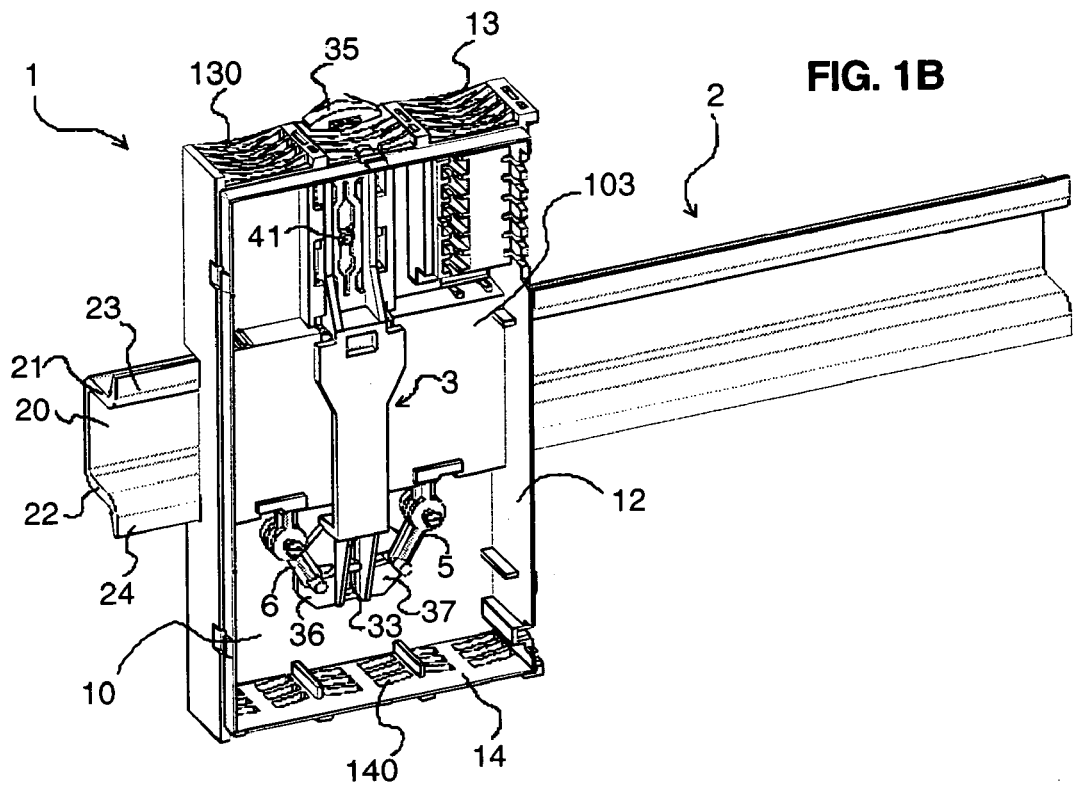
Figure 2A:
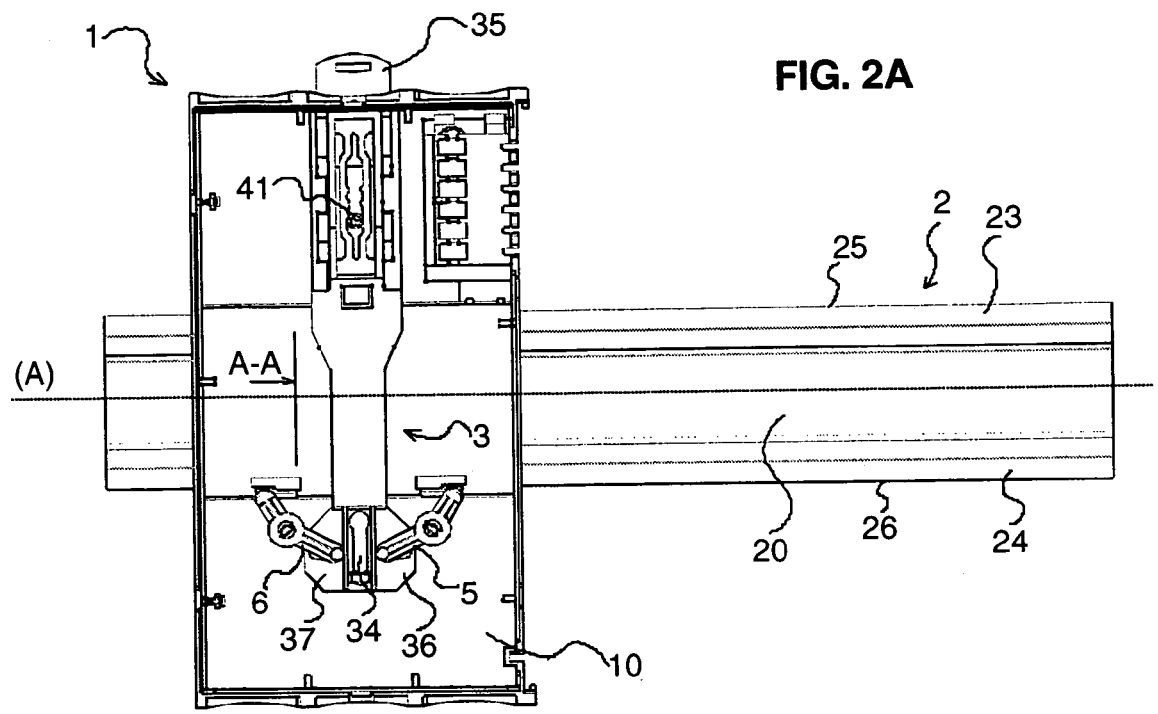
FIGS. 2A and 2B represent, in front view, the inside of the electric apparatus furnished with the attachment device according to the invention, respectively in a position of being unlocked from a supporting rail and a position of being locked onto this supporting rail.
Figure 2B:
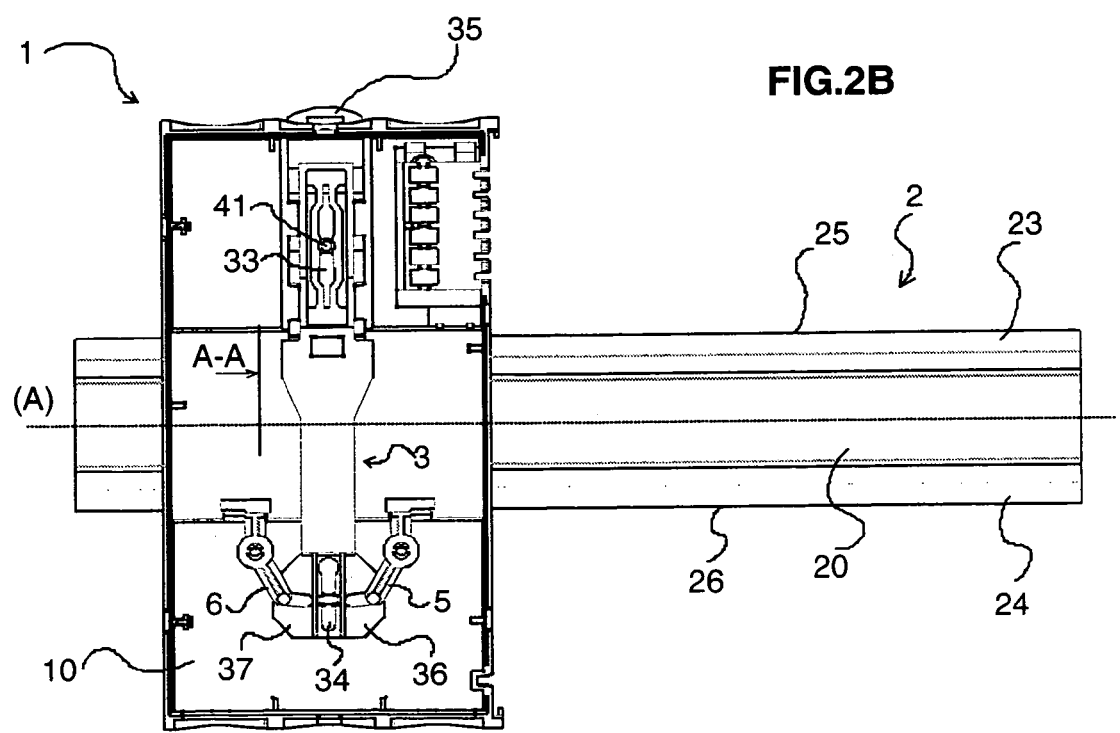

In FIGS. 1A and 1B, it can also be seen that the casing has aeration slots 130, 140 through its top panel 13 and its bottom panel 14.

The attachment device according to the invention is placed inside the casing of the electric apparatus 1 and attached to the inner face of the rear panel 10 of the casing (FIG. 3). The attachment device according to the invention has in particular the advantage of not obstructing the aeration slots 140 formed on the bottom panel 14 of the casing of the electric apparatus 1.

The attachment device comprises an actuation member consisting of an elongated plate 3, sliding in a slide formed inside the casing. As shown in FIGS. 1A and 1B, the plate 3 follows the inner shape of the rear panel 10 of the casing. With reference to FIGS. 3 and 6, the plate therefore mainly has a top part 30 and a bottom part 31 extending over the inner surface of the rear panel 10, either side of the inner surface of the recess 103 of the rear panel 10 and an intermediate part 32 espousing said inner surface of the recess 103. This intermediate part 32 has a greater length than the spacing distance between the two inner parallel edges formed by the recess 103, in order to give the plate 3 a freedom in translation.

The slide is formed so that the plate 3 can move along its length along an axis perpendicular to the axis (A) of the supporting rail 2 on which the electric apparatus 1 is placed and parallel to the bearing plane formed by the raised edges 23, 24 of the supporting rail 2. This slide consists of a rail 40 formed on the inner face of the rear panel 10 of the casing above the recess 103, in which the top part 30 of the plate 3 slides, and consists of two tenons 41, 42. A first tenon 41 (FIG. 3) interacts with a first guide 33 formed on the top part 30 of the plate 3 and a second tenon 42 (FIG. 3) interacts with a second guide 34 formed on the bottom part 31 of the plate 3.

According to the invention, the first guide 33 formed on the top part 30 of the plate 3 has two successive constrictions or bosses 330 forming elastically deformable hard points during the translation of the plate 3 (FIG. 6). These hard points make it possible to register the different positions of the plate 3 during the translation in the slide. In the direction of locking the electric apparatus 1 onto the supporting rail 2, the top end-of-travel end of the second guide 34 forms a stop to the translation movement of the plate 3 in the slide.

To be able to be controlled by a user, the plate 3 has a top end forming a tab 35 protruding outside the casing through an opening formed through the top panel 13 of the casing.

The plate 3 also comprises a first attachment means consisting of a hook 36 (FIG. 4B) intended to receive a raised edge 23 of the supporting rail 2 and formed opposite an opening 104 formed through the rear panel 10 of the casing, at the corner situated between the top face 101 of the guide passageway of the electric apparatus 1 and the bottom 100 of this passageway (FIG. 3). During the translation of the plate 3 in the direction of locking the electric apparatus 1, this hook 36 will protrude from the opening 104, on the outside of the casing to come and engage on the top raised edge 23 of the supporting rail 2.

The plate 3 has, at its end opposite the tab 35, on its bottom part 31, two symmetrical wings 36, 37 (FIG. 6) formed in the same plane as the bottom part 31 of the plate 3. In each of the wings 36, 37 an oblong opening 360, 370 is formed oriented along an axis perpendicular to the axis of translation of the plate 3. Each of these oblong openings 360, 370 forms a slide rail intended to receive an end 52 (FIG. 7) of a rod 5, 6. These rods 5, 6 form the second means of attaching the electric apparatus (1) onto the supporting rail 2 and each of them forms a distinct attachment point on the supporting rail 2. These rods 5, 6 are identical, fixedly attached to the casing and mounted in rotation on the inner face of the rear panel 10 of the casing, symmetrically relative to the axis of translation of the plate 3. The axis of rotation 50, 60 of the rods 5, 6 is perpendicular to the plane formed by the inner surface of the rear panel 10 of the supporting rail. The free end of each rod 5, 6, situated beyond its axis of rotation relative to the end fixedly attached to the plate 3, is placed facing an opening 7, 8 formed on the casing. These openings 7, 8 (FIG. 3) are formed either side of the plate 3, through the rear panel 10 of the casing, at the corner formed between the bottom 100 of the guide passageway of the casing and the bottom face 102 of this passageway.

Advantageously, the rods 5, 6 comprise, either side of their axis of rotation, two rigidly connected and angularly offset parts. Again advantageously, the free end of each rod 5, 6 may have a rib 51 intended to receive the bottom raised edge of the supporting rail 2 (FIG. 7).

Between the two wings 36, 37 of the plate 3, the second guide 34 is formed interacting with the tenon 42 formed on the inner face of the rear panel 10 of the casing to guide the plate 3 in translation relative to the casing. This second guide 34 will for example be shaped like a keyhole to make it easier to assemble/dismantle the plate 3.

According to the invention, once the two raised edges 23, 24 of the supporting rail 2 are resting against the bottom 100 of the guide passageway of the casing of the electric apparatus 1, a user comes to lock said casing onto the supporting rail 2. To perform this locking, the user acts on the tab 35 of the plate 3. In the unlocked position, the tab 35 is raised and the plate 3 is in the raised position. By pressing on the tab 35, the plate 3, guided by the slide formed on the inner face of the rear panel 10 of the casing, slides parallel to the bearing plane formed by the raised edges 23, 24 of the supporting rail 2 and perpendicular to the main axis (A). While moving, the hook 36 of the plate 3 protrudes outside the opening 104 and comes to engage on the top raised edge 23 of the supporting rail 2. The translation of the plate 3 also causes each of the ends of the rods 5, 6 to slide into the oblong openings 360, 370 formed on the wings 36, 37 of the plate 3. This sliding of the end of the rods 5, 6 causes the rods 5, 6 to rotate about their axis of rotation 50, 60. The rods 5, 6 being disposed in parallel, the two rods 5, 6 rotate in opposite directions. Thanks to this rotation, the free end of each rod 5, 6 comes to rest against the bottom edge 26 of the supporting rail 2. If the free end of each rod 5, 6 has a rib 51, the bottom raised edge 24 of the supporting rail 2 is engaged in this rib 51. When the electric apparatus 1 is locked onto the supporting rail, the part of each of the rods 5, 6 situated between its axis of rotation and its free end connected to the raised edge 24 of the supporting rail 2 follows an axis perpendicular to the main axis (A) of the supporting rail 2 (see FIG. 2B). With such a position of the rods 5, 6, the locking of the electric apparatus 1 is irreversible without an intentional action on the plate 3 of the actuation member. Specifically, any unwarranted force exerted on the casing of the electric apparatus 1, in a vertical plane and along an axis perpendicular to the axis (A) of the supporting rail 2, cannot generate a force forming a sufficient torque to unlock the rods 5, 6.

According to a variant embodiment of the invention, the plate and the rods form a single part. In such a configuration, the sliding of the end of each rod into its respective oblong opening is replaced by an elastic deformation between the rod and the plate.

It is clearly understood that it is possible, without departing from the context of the invention, to imagine other variants and enhancements of detail and even to envisage the use of equivalent means.

The invention claimed is:

1. A device configured to be locked and unlocked to a supporting rail with two opposite raised edges, the device comprising:
    a panel configured to slide longitudinally along the supporting rail in an unlocked position;
    a first attachment unit configured to be connected with a first raised edge of the supporting rail, configured to be movable in an unlocked position, and configured to take a locked position on the first raised edge of the supporting rail;
    a second attachment unit configured to be connected with a second opposite raised edge of the supporting rail, configured to be movable in an unlocked position, and configured to take a locked position on the second raised edge of the supporting rail; and
    an operating element connected to the first and second attachment units and configured to convert a translation movement of the first attachment unit into a rotary movement of the second attachment unit, the translation movement being a sliding movement of the operation element relative to the panel, the second attachment unit including a rod that is configured to perform the rotary movement when actuated by the translation movement of the operating element.

2. The device according to claim 1, wherein the operating element comprises an actuation member configured to perform the translation movement together with the movement of the first attachment unit, and an end portion of the actuation member protruding above the panel in a unlocked position.

3. The device according to claim 2, wherein the translation movement of the actuation member is performed perpendicularly to a longitudinal axis of the supporting rail and parallel to a bearing plane formed by the raised edges of the supporting rail.

4. The device according to claim 1, wherein the rod is rotatably attached to the panel by a pivot.

5. The device according to claim 2, wherein the rod includes a first end mounted to a guide rail formed on the actuation member and a second end configured to lock the panel onto a raised edge of the supporting rail.

6. The device according to claim 2, wherein the translation movement of the operating element is performed by the actuation member, and the rod and the actuation member are connected with each other by an elastically deformable part.

7. The device according to claim 6, wherein rod, the elastically deformable part and the actuation member form a single part.

8. The device according to claim 5, wherein the device includes two separate rods, the translation movement of the operating element is configured to rotate the two separate rods in opposite directions.

9. The device according to claim 8, wherein the two separate rods are mounted symmetrically relative to an axis of the translation movement.

10. The device according to claim 5, wherein at the second end the rod includes a rib configured to lodge with the raised edge of the supporting rail when the second attachment unit is in the locked position.

11. The device according to claim 2, wherein the actuation member is controlled manually.

12. The device according to claim 2, wherein the first attachment unit is formed on the actuation member.

13. The device according to claim 2, wherein the first attachment unit comprises a hook configured to receive the raised edge of the supporting rail.

14. The device according to claim 2, further comprising a device attached to the panel configured to simultaneously hold the first attachment unit in a locked or unlocked position.

* * * * *